United States Patent [19]

Beaujot

[11] Patent Number: 5,396,851
[45] Date of Patent: Mar. 14, 1995

[54] DUAL MATERIAL DISPENSING ASSEMBLY

[76] Inventor: Norbert F. Beaujot, Box 128, Langbank, Saskatchewan, Canada, S0G 2X0

[21] Appl. No.: 27,439
[22] Filed: Mar. 8, 1993
[51] Int. Cl.6 .............................. A01C 7/06
[52] U.S. Cl. ...................... 111/187; 111/73; 111/59; 111/69
[58] Field of Search ............. 111/187, 188, 176, 64, 111/73, 52, 59, 60, 69, 73

[56] References Cited

U.S. PATENT DOCUMENTS

| | | | |
|---|---|---|---|
| 2,981,213 | 4/1961 | O'Neil | 111/64 |
| 3,362,361 | 1/1968 | Morrison, Jr. | 111/73 |
| 3,964,639 | 6/1976 | Norris et al. | 111/176 X |
| 4,580,507 | 4/1986 | Dreyer et al. | 111/187 X |
| 4,762,075 | 8/1988 | Halford | 111/187 X |
| 4,926,767 | 5/1990 | Thomas | 111/187 |
| 5,025,736 | 6/1991 | Anderson | 111/187 X |
| 5,161,472 | 11/1992 | Handy | 111/187 X |
| 5,161,473 | 11/1992 | Landphair et al. | 111/176 |

FOREIGN PATENT DOCUMENTS 1239835  2/1988  Canada .
1229027  9/1960  France ................. 111/176
 989145  4/1965  United Kingdom ......... 111/176

Primary Examiner—Randolph A. Reese
Assistant Examiner—Christopher J. Novosad

[57] ABSTRACT

A dual dispensing device to be attached to the frame of an apparatus for seed and fertilizer placement in the ground comprising an elongate body member to be pivotally connected to the frame of the apparatus, a first dispenser for fertilizer is pivotally connected to the elongate body member, the first dispenser includes a first knife to make a first furrow in the ground and a first tube to carry fertilizer to be deposited in the first furrow. A fluid biasing element is pivotally connected to the first knife and to the frame to control the pivoting of the first knife. A second dispenser for seed is fixed to the elongate body member to the rear of the first dispenser, the second dispenser includes a second knife to make a second furrow in the ground and a second tube to carry seed to be deposited in the second furrow. Prior to the seed entering the seed tube the seed passes through a seed and air deceleration and air removal chamber. An adjustable gauge/packer wheel is fixed to the elongate body member to the rear of the seed dispenser.

14 Claims, 2 Drawing Sheets

DUAL MATERIAL DISPENSING ASSEMBLY

This invention relates to a seeding apparatus and in particular to a sub assembly of a seeding apparatus for expeditiously and separately depositing seed and fertilizer in the ground at a most precise and advantageous location.

RELATED APPLICATION

This application is related to copending U.S. patent application Ser. No. 07/885,450, filed on May 20, 1992, now U.S. Pat. No. 5,331,907 in the United States Patent Office by the same Inventor, Norbert F. Beaujot. This application for a "dual material dispensing assembly" is an improvement on the "seed row assembly" claimed in the previous application and can be substituted therefor.

BACKGROUND OF THE INVENTION

As previously pointed out there is an increasing awareness of the need to conserve the dry land soil resource existing in many parts of the country. Cultivators have in many cases been adapted to serve as a seeding machine but there has been a lack of depth control and sufficient packing of soil around the seed. With the advent of minimum or zero tillage for seed bed preparation to minimize the cost of production new implements such as applicants apparatus have been devised. Problems to overcome were the heavy previous crop residue and difficult precise penetration of the unworked soil.

Several attempts have been made to overcome the problems of proper seed and fertilizer deposition under the above adverse conditions. The most closely related attempts known to applicant are described in Canadian Patent 1,239,835 to Halford and U.S. Pat. No. 3,362,361 to Morrison and U.S. Pat. No. 2,981,213 to O'Neil.

In patent "835" there is disclosed a first dispensing means rigidly fixed to an implement frame, a second dispensing means pivotally mounted relative to the frame and an adjustment or biasing means connected between the frame and the second pivotal dispensing means mounting. In contrast applicants device has a first dispensing means pivotally mounted on an elongate body member and a second dispensing means fixed to the elongate body member with an adjustable gauge packer wheel fixed to the second dispensing means.

In patent "361" there is disclosed a first dispensing means fixed to a first tool bar of the frame with a trip release mechanism provided on the shank of the tool. The second dispensing means includes a floating assembly fixed to a second tool bar with a trench forming wheel in front and a press wheel in the rear with the seed tube vertically moveable relative to its mounting tool bar. In contast applicants device has a first dispensing means which is pivotally mounted on an elongate body member which is pivotally mounted on the frame. A second dispensing means is fixed to the elongate body member and has fixed thereto an adjustable gauge press wheel.

In patent "213" there is disclosed a first dispensing means having a furrow opener disc where depth is controlled by a gauge wheel both being mounted on the same pivotal arm. A second dispensing means is taught that has a pivoting furrow opener with attached seed tube. In contrast applicants first dispensing means has a knife furrow opener pivotally attached to an arm or elongate body member that is pivotally attached to the frame. The second dispensing means also has a knife furrow opener and is rigidly fixed to the same arm or elongate body member as the first dispensing means.

SUMMARY OF THE INVENTION

According to the present invention there is provided a dual material dispensing assembly comprising, an elongate body member having a forward first end, an intermediate portion and a rearward second end, frame mounting means directly and pivotally mounted on said first end, first material dispensing ground engaging means directly and pivotally mounted on said intermediate portions second material dispensing ground engaging means rigidly fixed adjacent said second end, biasing means directly and pivotally connecting said first material dispensing means to said frame mounting means to produce a biasing force directly on said first material dispensing means and adjustable packer means rigidly and directly fixed to said second end thereby adjustably controlling the location of the dispensed material in the ground.

From the above summary it is readily discernible that the primary object of the instant invention is to provide a dual material dispensing assembly that will deposit two separate materials in the soil or ground in a precise and expeditious manner.

It is a further object of this invention to provide seed and fertilizer dispensing means with a high trash clearance.

It is a further object of this invention to provide a dispensing assembly that does not require vertical movement of the frame for satisfactory operation.

It is yet another object of this invention to provide dual material dispensing that will cause a minimum of soil disturbance.

These and other objects of the present invention will become readily apparent as the following detailed description is read in conjunction with the accompanying drawings wherein like reference numerals will indicate like elements throughout the several views.

DETAILED DESCRIPTION OF PREFERRED EMBODIMENT

Figures 1, 2:
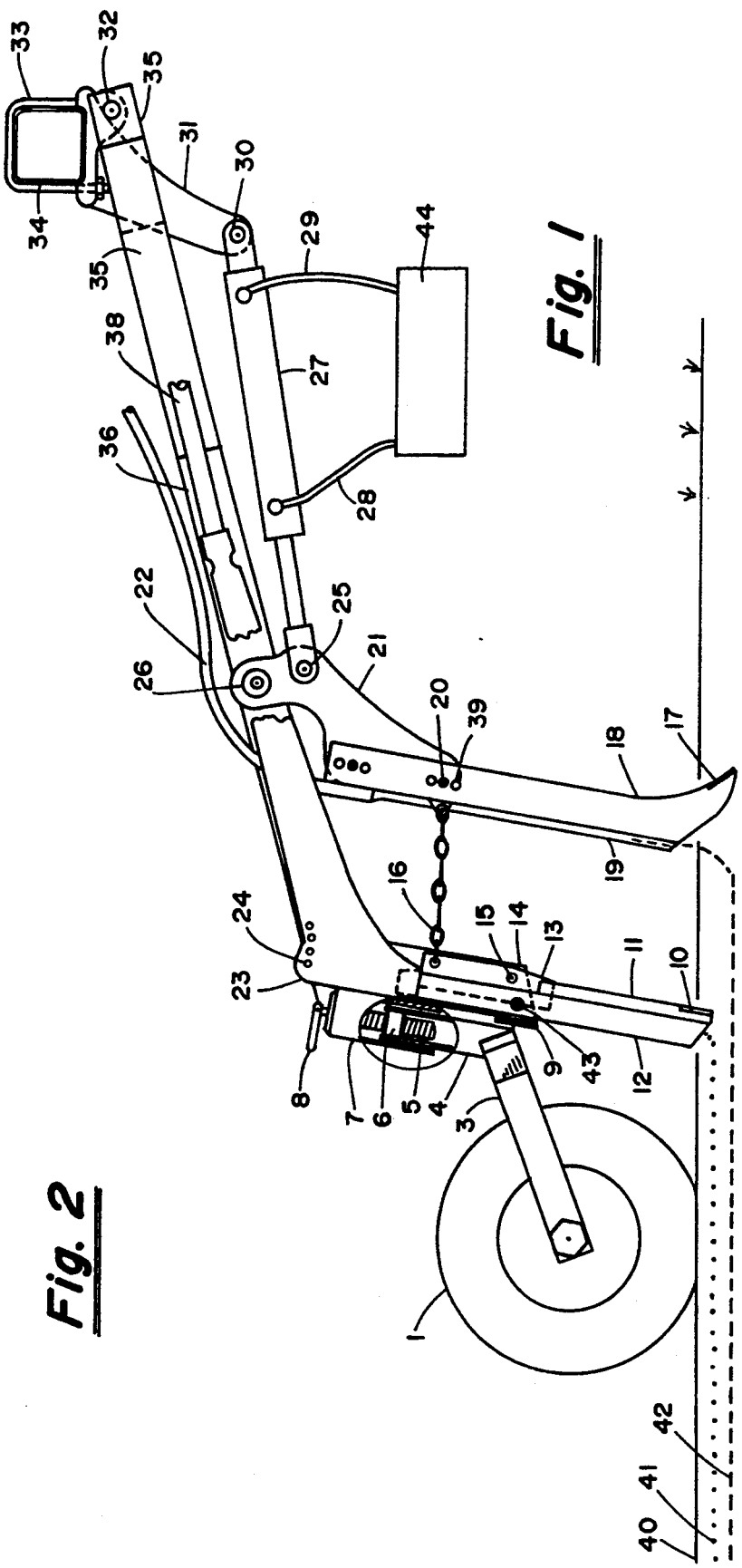
FIG. 1 is a side elevation of the dual material dispensing assembly.
FIG. 2 is a plan view of the dual material dispensing assembly.

Reference is now made to FIG. 1 where there is shown the dual material dispensing assembly as it would appear in operation. The assembly is shown mounted on a standard or typical box main frame 34 of a planting apparatus by "⊔" bolts 33. The "⊔" bolts 33 fasten a main frame mounting bracket 31 to the typical box type main frame 34. Pivotally connected at 32 to the main frame mounting bracket 31 is an elongate body member 36. The elongate body member is laterally supported by an elongate body member mount 37 on one side and an elongate body member brace 35 on an opposite side. Intermediate the ends of elongate body member 36 is a pivot mount 26 to pivotally mount pivot bracket 21 thereto. Releasable biasing means are generally but not necessarily in the form of a double acting hydraulic cylinder 27 and are pivotally connected at a first end by a cylinder pivot pin 25 to pivot bracket 21 and at a second end to main frame mounting bracket 31 by a cylinder pivot pin 30. The double acting hydraulic cylinder 27 has two fluid conductors 28 and 29. Pressure in the fluid conductor 28 supplies trip and packing pressure while pressure in conductor 29 supplies a force to lift the dual material dispensing assembly out of the ground for turning or transport. The hydraulic controls 44 are those illustrated in FIG. 7 of U.S. application Ser. No. 07/885,450 referred to above and do not form a part of this invention. The pivot bracket 21 carries a first dispensing means knife 18 which is generally bolted to the pivot bracket 21 and with extra apertures is vertically adjustable for changing seed to fertilizer depth proximity. On the forward tip of the knife 18 is found a carbide wear tip 17. On the rearward edge of the knife 18 is mounted a fertilizer dispensing tube 19 which receives fertilizer from a supply via a conduit or hose 22.

The operational movement of the seeding apparatus is such that the first or fertilizer dispensing means is first to engage the soil or ground and therefore with its knife 18 cuts a furrow for the deposition of fertilizer. The knife 18 with its wear tip 17 is also first to engage any obstacles as the apparatus moves forward. When an obstacle is encountered by the knife 18 it generates an overload pressure in the cylinder 27 which is transferred to the hydraulic control 44 which releases the pressure allowing the knife 18 to trip or release and pass over the obstacle. The knife 18 and the remainder of the first dispensing means then is brought forward by the hydraulic cylinder 27 to its normal operating position by a restoration pressure from the hydraulic controls 44. The forward movement of the first dispensing means is limited by a flexible tensile member or tether 16 which is normally in the form of a chain. The hydraulic cylinder 27 with hydraulic controls 44 is therefore considered to be a releasable biasing means.

The elongate body member 36 has welded or otherwise rigidly attached thereto a second dispensing means to place seed in the soil. The dispensing means has a seed knife mount 14 welded to the elongate body member 36. Mounted on the seed knife mount 14 is a seed knife bolt plate 13 attached thereto by mounting bolts 15. Connected to the seed knife bolt plate 13 is seed tube 12 which carries at its forward edge a seed knife 11 with carbide wear tip 10. Seed from a supply passes through a conduit or feed line 38 into a seed and air deceleration and air removal chamber 23. This chamber 23 has on its upper surface apertures 24 for the exhausting of a portion of the air conveying the seed to prevent any damage thereto. The seed tube 12 receives seed from the deceleration chamber 23 to place it into a furrow in the ground made by the seed knife 11. On the rear of the seed knife mount 14 is a depth adjustment gauge 9 to indicate the vertical movement of the adjustable packer means. From the seed or second dispensing means a flexible tensile member or tether 16 normally in the form of a chain extends from a seed knife mount bolt 15 to the first dispensing means knife 18 to limit its movement away from the second dispensing means when it is moved by the hydraulic releasable biasing means 27. Movement of the first dispensing means knife 18 in a rearward direction is firstly limited by limit stop 43. Further rearward movement raises the complete assembly out of the ground as it pivots about pivot 32.

A depth adjustment jack outer member 7 is welded or otherwise fixed to the rear of seed knife mount 14 and to elongate body member 36. A depth adjustment jack inner member 4 is telescopically moved within the jack outer member 7 by rotating a depth adjustment jack screw 5 which reacts with a depth adjustment jack nut 6 welded to jack inner member 4. The rotation of jack screw 5 is accomplished by rotation depth adjustment jack handle 8.

A dual function gauge/packer wheel 1 is rotatably mounted on wheel axle 2 supported by wheel fork 3 welded to depth adjustment jack inner member 4. To the rear of the gauge/packer wheel there is indicated at 40 the packed ground level, at 41 the seed location, and at 42 the fertilizer location.

Referring now to FIG. 2 which is a plan view of FIG. 1 there is shown the exact same dispensing assembly but which more clearly shows the dimensions of the main frame bracket 31 and how two "⊔" bolts 33 clamps the main frame bracket 31 to the main frame 34. The elongate body member mount 37 hidden in FIG. 1 is now clearly shown. The elongate body member brace 35 is now illustrated to give it its proper dimension. The seed and air deceleration and air removal chamber 23 is generally made of plastic and receives the seed tube 12. The pattern of the apertures 24 is now illustrated more clearly. All the remaining elements with their location and function should be quite obvious to one skilled in the art.

Figure 3:
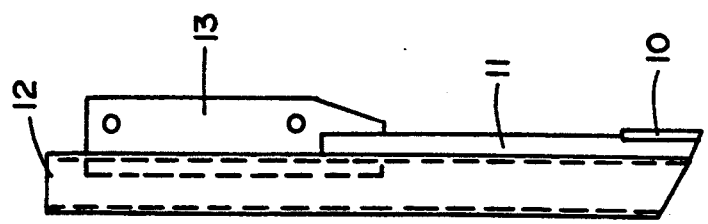
FIG. 3 is a side elevation of the seed tube seed knife assembly.

To more clearly illustrate the lower portion of the second or seed dispensing means there is shown in FIG. 3 a seed knife bolt plate 13 having fixed thereto a seed tube 12. To the front of the seed tube 12 is fixed a seed knife 11 which prepares a furrow in the ground for the seed as well as strengthen the seed tube, which is rearwardly inclined to more easily pass over obstacles in its path. A carbide wear tip 10 has also been provided to decrease the wear and tear on the knife.

Figure 4:
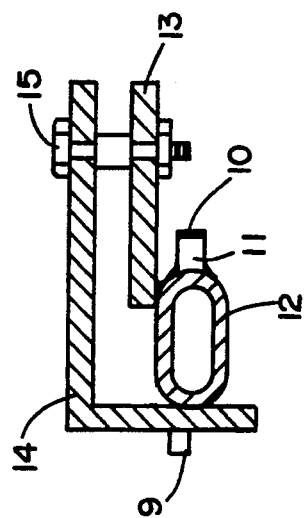
FIG. 4 is a transverse cross section of the seed tube mounting taken at one of the mounting bolts.

Now referring to FIG. 4 there is shown the seed knife mount 14 which is generally welded to the elongate body member 36. The seed knife bolt plate 13 is shown spacedly fixed by mount bolts 15 to seed knife mount 14 but may be fixedly mounted adjacent thereto for a more rigid support. As previously pointed out this is a transverse cross section at one of the seed knife mount bolts 15. The rear of seed tube 12 abuts the seed knife mount 14 and is fixed to the seed knife bolt plate 13. The seed knife 11 is shown fixed to the front of seed tube 12 and carries a carbide wear tip 10 at a lowermost portion thereof. On the rear of the seed knife mount 14 is mounted a scale or depth gauge to cooperate with a pointer or indicator on the wheel fork 3 to give the operator of the machine an indication of the depth of placement of the material being dispensed.

Various modifications such as size, shape and arrangement of components may be made without departing from the spirit and scope of the invention. The above disclosure shall be interpreted as illustrative only and limited only by the scope of the invention as defined in the following claims.

What I claim is:

1. A dual material dispensing assembly for a planting apparatus having a frame comprising in combination, an elongate body member, frame mounting means to mount said elongate body member on said frame, a pivot bracket pivotally mounted on said elongate body member, a first dispensing means for dispensing fertilizer including a first dispensing means knife adjustably mounted on said pivot bracket, a first dispensing means tube mounted adjacent said first dispensing means knife, an adjustable hydraulic biasing and trip release means connected between said pivot bracket and said frame mounting means, a second dispensing means for dispensing seed including a seed knife mount fixed to said elongate body member, a seed knife bolt plate mounted on said seed knife mount, a seed knife mounted on said seed knife mount, a seed tube mounted on said seed knife mount rearwardly of said seed knife, a limit stop mounted on said second dispensing means to limit the rearward travel of said first dispensing means relative to said second dispensing means, a tether between said second dispensing means and said first dispensing means to limit their separation, an adjustable depth gauge packer means fixed to said seed knife mount rearwardly of said second dispensing means whereby two different materials fed separately into said first dispensing means and said second dispensing means will be planted and compacted at precise levels separate and apart from one another.

2. A dual material ground engaging dispensing assembly for a planting apparatus having a frame to be moved forward over the ground comprising in combination, an elongate body member having a forward first end, an intermediate portion and a rearward second end, frame mounting means directly and pivotally mounted on said first end, first material dispensing ground engaging means directly and pivotally mounted on said intermediate portion, second material dispensing ground engaging means rigidly fixed adjacent said second end, biasing means directly and pivotally connecting said first material dispensing ground engaging means to said frame mounting means to produce a biasing force directly on said first material dispensing ground engaging means and adjustable packer means rigidly and directly fixed to said second end thereby adjustably controlling the location of the dispensed material in the ground.

3. A dual material dispensing assembly as claimed in claim 2 wherein said first material dispensing ground engaging means includes a pivot bracket, a first ground engaging knife mounted on said pivot bracket and a first material dispensing tube mounted on said first ground engaging knife, said pivot bracket pivotally connecting said first material dispensing ground engaging means to said elongate body member.

4. A dual material dispensing assembly as claimed in claim 2 wherein said second material dispensing ground engaging means includes a knife mount, a second ground engaging knife mounted on said knife mount and a second material dispensing tube mounted on said knife mount.

5. A dual material dispensing assembly as claimed in claim 4 wherein said biasing means is a hydraulic pressure cylinder controlled by an overload release whereby a working overload applied to said first material dispensing ground engaging means permits pivoting of said first material dispensing ground engaging means relative to said frame.

6. A dual material dispensing assembly as claimed in claim 5 wherein said adjustable packer means includes a threaded adjustment to vertically move said packer means relative to said second material dispensing ground engaging means.

7. A dual material dispensing assembly as claimed in claim 6 further including a tethering member connecting said first material dispensing ground engaging means and said second material dispensing ground engaging means so that said first material dispensing ground engaging means is limited in its travel away from said second material dispensing ground engaging means.

8. A dual material dispensing assembly as claimed in claim 2 wherein said second material dispensing ground engaging means includes a material deceleration chamber having air release apertures.

9. A dual material dispensing assembly as claimed in claim 8 wherein said first material dispensing ground engaging means and said second material dispensing ground engaging means are limited in a separating movement by a tether.

10. A dual material dispensing assembly as claimed in claim 9 further including a travel limiting abutment on said second material dispensing ground engaging means to be engaged by and limit the rearward travel of said first material dispensing ground engaging means.

11. A dual material dispensing assembly as claimed in claim 9 wherein said first material dispensing ground means and said second material dispensing ground engaging means each carries a replaceable knife.

12. A dual material dispensing assembly as claimed in claim 8 wherein movement of said biasing means is limited by a release of biasing pressure upon said first material dispensing ground engaging means raising said biasing pressure by engagement of an obstacle in the direction of travel.

13. A dual material dispensing assembly as claimed in claim 12 wherein said second material dispensing ground engaging means carries a depth adjustment gauge.

14. A dual material dispensing assembly as claimed in claim 8 wherein said biasing means is located below said elongate body member.

* * * * *